United States Patent
Stiehler et al.

(10) Patent No.: US 10,830,098 B2
(45) Date of Patent: Nov. 10, 2020

(54) BEARING CHAMBER HOUSING FOR A TURBOMACHINE

(71) Applicant: MTU Aero Engines AG, Munich (DE)

(72) Inventors: Frank Stiehler, Bad Liebenwerda (DE); Georg Kempinger, Eching (DE); Juergen Kraus, Dachau (DE); Steffen Schlothauer, Erdweg (DE); Christian Liebl, Bockhorn (DE); Alois Eichinger, Pfaffenhofen (DE); Thomas Koebke, Eichenau (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 16/419,773

(22) Filed: May 22, 2019

(65) Prior Publication Data
US 2019/0360355 A1    Nov. 28, 2019

(30) Foreign Application Priority Data

May 23, 2018   (DE) .......................... 10 2018 208 038

(51) Int. Cl.
*F01D 25/16*    (2006.01)
*F01D 25/18*    (2006.01)
*F01D 25/24*    (2006.01)
*B33Y 80/00*    (2015.01)

(52) U.S. Cl.
CPC ............. *F01D 25/16* (2013.01); *F01D 25/18* (2013.01); *F01D 25/24* (2013.01); *B33Y 80/00* (2014.12)

(58) Field of Classification Search
None
See application file for complete search history.

(56) References Cited

U.S. PATENT DOCUMENTS

| 7,878,303 | B2 * | 2/2011 | Munson | F01D 25/183 |
| | | | | 184/6.11 |
| 8,210,316 | B2 * | 7/2012 | DiBenedetto | F01D 9/065 |
| | | | | 184/6.11 |
| 8,381,878 | B2 * | 2/2013 | DiBenedetto | F02K 3/04 |
| | | | | 184/6.11 |
| 9,234,439 | B2 | 1/2016 | Demitraszek, Sr. et al. | |
| 9,989,083 | B2 * | 6/2018 | Labbe | F02C 7/06 |
| 10,047,649 | B2 * | 8/2018 | Lucas | F01M 11/02 |
| 10,221,766 | B2 * | 3/2019 | Wotzak | F02C 3/04 |
| 10,247,036 | B2 * | 4/2019 | Do | F01D 25/32 |
| 10,287,915 | B2 * | 5/2019 | McCune | F02C 7/06 |

(Continued)

FOREIGN PATENT DOCUMENTS

| DE | 102014208040A1 A1 | 10/2015 |
| EP | 3075471 A1 | 10/2016 |

(Continued)

*Primary Examiner* — Michael Lebentritt
(74) *Attorney, Agent, or Firm* — Barlow, Josephs & Holmes, Ltd.

(57) ABSTRACT

The present invention relates to a bearing chamber housing for bearing a shaft of a turbomachine, having an additively built-up housing wall and a cover of the oil chamber, wherein, in each case referred to an axis of rotation of the shaft, the housing wall bounds radially outwardly an oil chamber of the bearing chamber housing and the cover of the oil chamber disposed on an axial end of the housing wall axially bounds a region of the oil chamber; the region bounds radially inwardly an inner shell of the bearing chamber housing.

18 Claims, 5 Drawing Sheets

(56) References Cited

U.S. PATENT DOCUMENTS

| | | | |
|---|---|---|---|
| 10,526,907 B2* | 1/2020 | Blais | F01D 11/02 |
| 2006/0037302 A1* | 2/2006 | Peters | F01D 25/18 |
| | | | 60/39.08 |
| 2014/0174858 A1* | 6/2014 | Remer | F02C 7/06 |
| | | | 184/106 |
| 2015/0131931 A1* | 5/2015 | Duecker-Schulz | F16C 17/047 |
| | | | 384/121 |
| 2015/0224743 A1* | 8/2015 | Schick | B22F 5/10 |
| | | | 428/615 |
| 2016/0281534 A1* | 9/2016 | Noel | F01D 25/162 |
| 2019/0112983 A1* | 4/2019 | Manteiga | F01D 25/125 |

FOREIGN PATENT DOCUMENTS

| | | |
|---|---|---|
| EP | 2511030 A3 | 2/2017 |
| GB | 2522315 A | 7/2015 |
| WO | 2012112779 A2 | 8/2012 |
| WO | 2014150365 A1 | 9/2014 |
| WO | 2014158600 A1 | 10/2014 |

\* cited by examiner

BEARING CHAMBER HOUSING FOR A TURBOMACHINE

BACKGROUND OF THE INVENTION

Technical Field

The present invention relates to a bearing chamber housing for bearing a shaft of a turbomachine.

Prior Art

The turbomachine may involve, for example, a jet engine, e.g., a turbofan engine. Functionally, turbomachines are divided into compressor, combustion chamber, and turbines. Roughly speaking, in the case of the jet engine, aspirated air is compressed by the compressor and burned in the downstream combustion chamber with added kerosene mixed in. The hot gas that arises, a mixture of combustion gas and air, flows through the downstream turbine and is thereby expanded. The turbine is usually constructed from a plurality of stages, each with a stator (guide vane ring) and a rotor (rotating blade ring), the rotors being driven by hot gas. In this case, internal energy is withdrawn proportionally to the hot gas in each stage and is converted into a movement of the particular rotating blade ring and thus of the shaft.

The present subject relates to a bearing chamber housing for bearing the shaft, wherein the reference first to a jet engine shall not limit the generality of the concept of the invention. The turbomachine may also involve, for example, a stationary gas turbine.

SUMMARY OF THE INVENTION

The technical problem that is the basis of the present invention is to specify a particularly advantageous bearing chamber housing for a turbomachine, as well as an advantageous method for the manufacture thereof.

According to the invention, this is achieved by a bearing chamber housing and by a method for the manufacture thereof. A housing wall of the bearing chamber housing is or will be built up generatively or additively, therefore built up based on a data model by selective solidifying in regions of an initially shapeless material or one of neutral shape (see below in detail). A cover for an oil chamber is then disposed on one axial end of the housing wall, said cover axially bounding an oil chamber formed inside the bearing chamber housing; in concrete terms, it bounds a region of the oil chamber that is bound radially inwardly by an inner shell of the bearing chamber housing. A particular feature lies in the course of the housing wall, which extends axially at first in an axial segment away from the axial end, namely when observed in an axial section, and then springs back radially inwardly in a radial segment, and in fact extends up to the inner shell. If the outer wall surface of the housing wall is observed, this surface thus forms a pocket or recess; thus it is shaped with a depression. On the other hand, if the inner wall surface of the housing wall in the radial segment is observed, said surface bounds the region of the oil chamber in the axial direction (axially opposite to the cover of the oil chamber), said region being disposed radially between inner shell and housing wall.

This course, i.e., the inwardly indented shape, may be of advantage with respect to the additive manufacture. With the housing wall pulled inwardly in the radial segment, namely, a piece of the inner wall surface is displaced far backward axially, when compared to a wall running essentially axially out over the axial segment. In comparison, a short distance between the axial end of the housing wall and the inner wall surface can thereby be produced in the radial segment, and the inner wall surface and this region are well accessible. Therefore, following the additive build-up, for example, a material-removing post-processing may be conducted, e.g., by milling or turning, etc. (see also below in detail), which may be of advantage with respect to the final shaping, but also relative to the surface quality.

On the other hand, however, not only is the inner wall surface displaced axially backward, but the outer wall surface is "pressed in" with it, which makes possible an overall weight-optimized construction. An inner wall surface displaced axially backward could in fact also be achieved if the pocket were filled with material and the outer wall surface correspondingly were to continue axially. The filling of the pocket, however, would then mean more material and thus a greater weight, which can be disadvantageous for manufacture and transport, and, for example, in the case of an aircraft engine, can permanently adversely affect the kerosene consumption thereof.

Preferred embodiments are found in the dependent claims and the entire disclosure, wherein, in the presentation of the features, a distinction is not always made individually between device, method and use aspects; in any case, the disclosure is to be read implicitly with respect to all claim categories. If, for example, reference is made to a bearing chamber housing manufactured in a specific manner, this is always to be read also as a disclosure of a corresponding manufacturing method, and vice versa.

The terms "axially" and "radially", as well as the directions belonging thereto, in the scope of this disclosure, refer to the axis of rotation of the shaft, which, when considering the turbomachine, coincides overall with the longitudinal axis thereof. The rotors rotate around the axis of rotation "circumferentially" during operation, namely in the "circumferential direction (direction of revolution)". "A" and "one" are to be read as the indefinite article and thus, unless specifically indicated otherwise, are always to be read as "at least one". As will become clear in detail in the following, there can be a plurality of pockets that are distributed, for example, over a complete revolution or circumference (360° around the axis of rotation); in the circumferential direction, the pocket extends over the circumferential segment, a partial angle region of the entire circumference. Preferably, there exists a rotational symmetry over the circumferential segment, with the axis of rotation as the axis of symmetry.

The inner shell, which preferably forms a bearing mount, is disposed radially inside the region of the oil chamber that is disposed axially between the radial segment of the housing wall and the cover of the oil chamber. A bearing for supporting the shaft can be or will be able to be disposed in this bearing mount, e.g., a ball bearing or a roller bearing. This bearing is then advantageously surrounded radially outwardly by oil disposed in the oil chamber, which can create a certain screening relative to the hot-gas channel of the turbomachine and thus can help reduce temperature gradients and mechanical stresses. The hot-gas channel is disposed radially outside and extends from the combustion chamber through the turbine or turbine module to the nozzle.

Preferably, a fastening means for fastening the cover of the oil chamber can be formed at the axial end of the housing wall at which said cover is or will be placed. Preferably, the cover of the oil chamber is joined to the housing wall so that it can be detached in a nondestructive manner, preferably joined by screws. For this purpose, for example, a radially outward cantilevered tab with an eyelet can be provided as a fastening means at the axial end, plus a corresponding flange or flange segments can be provided. Also, independently of this, the housing wall radially outwardly bounding the oil chamber is or will be built up preferably together with the inner shell. In order to form the bearing mount, the inner wall surface, in particular its radially inwardly pointing surface, can next be post-processed mechanically and then shaped, for example with grooves, etc.

In a preferred embodiment, the housing wall in the radial segment extends perpendicularly to the axis of rotation. Again, this is referred first to an axial section; a corresponding course over the entire circumferential segment is preferred. In this connection, it is also clear that the radial course of the housing wall in the radial segment generally need not imply an exclusively radial (and thus perpendicular) extension, but the housing wall can also run (slightly) obliquely to the axis of rotation. This applies in an analogous way to the axial segment, in which the housing wall generally need not exclusively extend axially, but also, for example, can be formed (slightly) conically. Preferably, the housing wall in the axial segment nonetheless lies axisparallel; it thus extends exclusively axially (and circumferentially).

In a preferred embodiment, a flanking segment, which extends radially outwardly obliquely to the axis of rotation when considered in the axial section, follows from the axial end of the housing wall to the radial segment. The flanking segment and the radial segment together bound the pocket in the axial direction.

In a preferred embodiment, the bearing chamber housing has a fastening flange on the outside at the housing wall, said flange projecting radially outwardly. The latter is or will be preferably built up additively together with the housing wall. The fastening flange serves for fastening the bearing chamber housing and thus the entire bearing arrangement in the turbomachine; it thus must take up comparatively large forces. This can be taken into consideration particularly advantageously in the design due to the additive manufacture. Thus, for example, a crosspiece of the fastening flange extending away from the housing wall can be optimized on the basis of structural-mechanical simulations. For example, with a variable thickness and/or adapted inclination relative to the axis of rotation, a certain spring effect can be achieved that may permit an equilibration of vibrations (that may arise, since the bearing represents a connection site between stators and rotors).

In a preferred embodiment, a crosspiece of the fastening flange by which it transitions into the housing wall extends obliquely to the axis of rotation when observed in the axial section. Preferably, the crosspiece and the flanking segment that also extends obliquely (see above) enclose the same angle with the axis of rotation for their particular oblique extension; thus, they are set up obliquely in the same way relative to the axis of rotation. Preferably, in the axial section, the crosspiece and the flanking segment are flush with one another in their oblique extension, and thus lie (when observed in the section) on a common straight line that is oblique to the axis of rotation. An "oblique" orientation generally means not perpendicular and not parallel; for example, an angle of at least 10° or 20° and (independently from this) no more than 80° or 70° may be enclosed with the axis of rotation.

In a preferred embodiment, a side wall section of the housing wall bounds the pocket in the circumferential direction. In this side wall section, the housing wall extends axially and radially. Starting from the bottom of the pocket, the housing wall then rises outwardly locally. On the one hand, a corresponding side wall section can take over a fluid function relative to the interior of the bearing chamber housing (for conducting the oil; see below); on the other hand, however, it may also already be of interest mechanically, in a sense representing a stiffening rib.

In a preferred embodiment, when viewed in a section perpendicular to the axis of rotation, the housing wall in the side wall section encloses an angle of at least 80°, preferably at least 90°, and (independently from this) at most 100°, preferably at most 95°, with the housing wall in the flanking segment (at the site where it bounds the side wall section).

In a preferred embodiment, there is a second side wall section, which is displaced in the circumferential direction relative to the first side wall section, which has been discussed up to now. Starting from the pocket in the circumferential segment, there thus follows in the circumferential direction first the first side wall section and then the second side wall section, which then in turn preferably bounds another pocket. Pockets are thus assigned to the first and the second side wall sections and these are adjacent circumferentially, wherein the first side wall bounds the pocket according to the main claim together with another side wall section (a third in this terminology, but not in the sequence in the circumferential direction).

The first and the second side wall sections together preferably bound a connection channel in the circumferential direction. The latter channel connects the region of the oil chamber disposed at the cover of the oil chamber or at the axial end of the housing wall, this region surrounding the bearing mount (see above), with a region radially inside the pocket or in general with the rest of the oil chamber inside the bearing chamber housing. There may also be another bearing mount in the bearing chamber housing that is spaced apart axially, for example, wherein, preferably, a region at or around this mount is also joined (via the connection channel) with the region at the axial end of the housing wall.

In a preferred embodiment, a connection opening is introduced into the housing wall, this opening creating a connection between the oil chamber and an external region outside the housing wall. The connection opening is preferably oriented radially; more preferably, its center axis is perpendicular to the axis of rotation. Independently therefrom, in detail, the connection opening lies at the same axial position as the pocket; in other words, it follows the pocket or the circumferential segment in the circumferential direction (neglecting a slight radial displacement).

In a preferred embodiment, the connection opening is arranged in a connection section of the housing wall that is disposed circumferentially between the first and the second side wall sections. The connection opening thus lies at the same circumferential position as the connection channel. A corresponding folding of the structures may be of interest, for example, with respect to the additive manufacture, since a more complex geometry needs to be built up or post-processed only at the common circumferential position. In general, a connection opening and a connection channel, however, also may be provided separately, of course, thus circumferentially displaced with respect to one another.

In a preferred embodiment, a connection piece projecting radially outwardly forms the connection opening. This connection piece then transitions into the housing wall, preferably having a rib extending axially and radially. On one hand, this may be of interest for structural mechanics; on the other hand, however, in particular, it may also help simplify the additive build-up. The rib is preferably found upstream of the connection piece referred to the build-up direction, so that it thus creates, visually speaking, a "softer" transition to the connection piece; i.e., thus at least it helps to reduce an overhang.

Even though in general, a connection opening is also conceivable that remains free in the additive build-up, preferably, it is subsequently mechanically introduced. The pin is built up additively, and subsequently the connection opening is introduced from radially outside, e.g., it is drilled or milled.

In a preferred embodiment, the pocket extends in the circumferential direction over at most 60°, whereby at most 50°, 40° or 30° are further preferred, with increasing preference in the named sequence. Possible lower limits can lie, for example, at least at 10° or 20°. Preferably, there is a plurality of pockets distributed over the circumference, i.e., at least two, but usually still more, e.g., at least three, four, or five pockets (with possible upper limits of, e.g., at most 20 or 15). The pockets preferably provided in multiple number may also differ in their extension or dimension in the circumferential direction; the preferred angle data thus apply first to at least one pocket, preferably for at least a few pockets, particularly preferred for all pockets.

As already mentioned, the invention also relates to a method for manufacturing a bearing chamber housing disclosed herein, wherein the housing wall is built up additively. Preferably, the additive build-up takes place in a powder bed process. The material from which the housing wall is manufactured in this case is applied sequentially in powder form, layer by layer, whereby a region in each layer that is predetermined on the basis of a data model (of the component geometry; see above) is selectively solidified. The solidification takes place by melting by means of a radiation source, wherein in general, for example, an electron beam source is also conceivable. Melting is preferably carried out with a laser source, namely a laser beam; the additive build-up is thus a selective laser melting (SLM).

In a preferred embodiment, the build-up direction thereby is directed from the end of the housing wall to the radial segment. Therefore, first the axial segment is built up from the axial end of the housing wall, then the radial segment, and finally the flanking segment. Nevertheless, relative to the additively built-up component overall, in this case, upstream of the axial end of the housing wall, still other regions will also be able to be built up, e.g. portions of the inner shell (see also the exemplary embodiment for illustration).

In the additive build-up relative to the radial segment, in order to generate the desired inner wall surface, preferably two flanks that converge into one another are built up first (which form a V when viewed in an axial section). Subsequently, material is removed by post-processing, e.g., by turning or milling, and these flanks are partially removed, so that a U shape results. Based on the course of the housing wall according to the invention (see above), the interior space is well accessible for such a post-processing (prior to attaching the cover of the oil chamber).

The invention also relates to the use of a presently disclosed bearing chamber housing for a turbomachine, in particular for a jet engine. The bearing chamber housing preferably finds use in a turbine midframe. During operation, it accommodates the shaft of the turbomachine, which then rotates around the axis of rotation, wherein the oil chamber of the bearing chamber housing is filled with oil.

The turbine midframe can also be arranged in general between the combustion chamber and the turbine module(s); it is preferably designed for arrangement between two turbine modules, e.g., between a high-pressure and an intermediate-pressure or low-pressure turbine. Then one or a plurality of bearings can be arranged in the bearing chamber housing for guiding the shaft, e.g., in the case of the exemplary embodiment, a ball bearing and a roller bearing. A turbine midframe having a bearing chamber housing according to the invention, as well as a turbine midframe shall also be expressly disclosed.

BRIEF DESCRIPTION OF THE DRAWINGS

In the following, the invention will be explained more closely on the basis of an exemplary embodiment, wherein the individual features in the scope of the independent or coordinated claims can also be essential to the invention in another combination, and wherein also no distinction is made individually between the different claim categories.

Taken individually.

DESCRIPTION OF THE INVENTION

Figure 1:
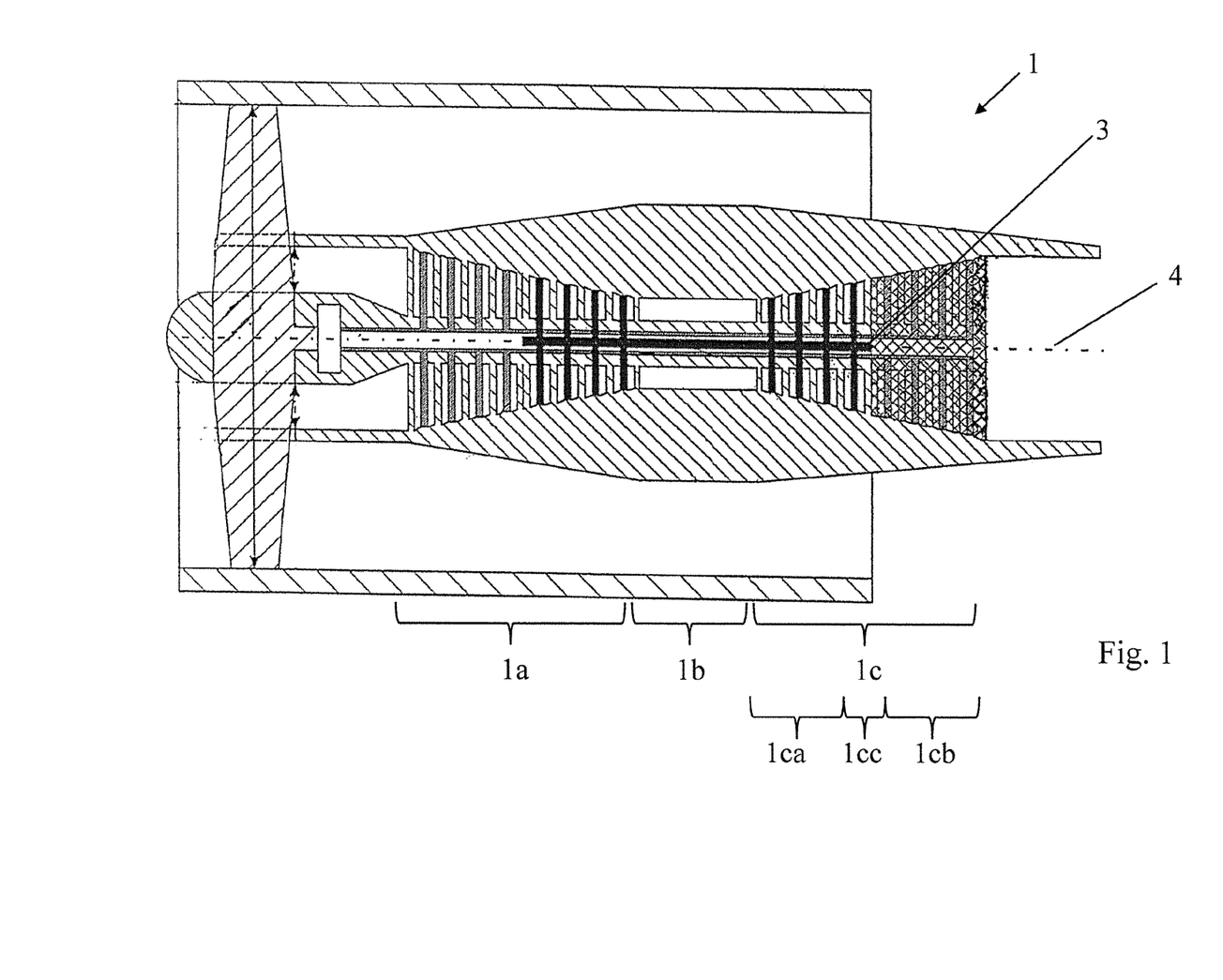
FIG. 1 shows a jet engine in an axial section.

FIG. 1 shows a turbomachine 1 in a schematic view, concretely a jet engine. Functionally, the turbomachine 1 is divided into compressor 1a, combustion chamber 1b, and turbine 1c. Both the compressor 1a as well as the turbine 1c are each constructed from two modules in the present case. Between a high-pressure turbine module 1ca directly downstream from the combustion chamber 1b and a low-pressure or intermediate-pressure turbine module 1cb is found the turbine midframe 1cc. The rotors of the turbine module 1ca, cb each rotate around an axis of rotation 4 on a shaft 3. A bearing or bearings for this shaft 3 is or are arranged in the turbine midframe 1cc.

Figure 2:
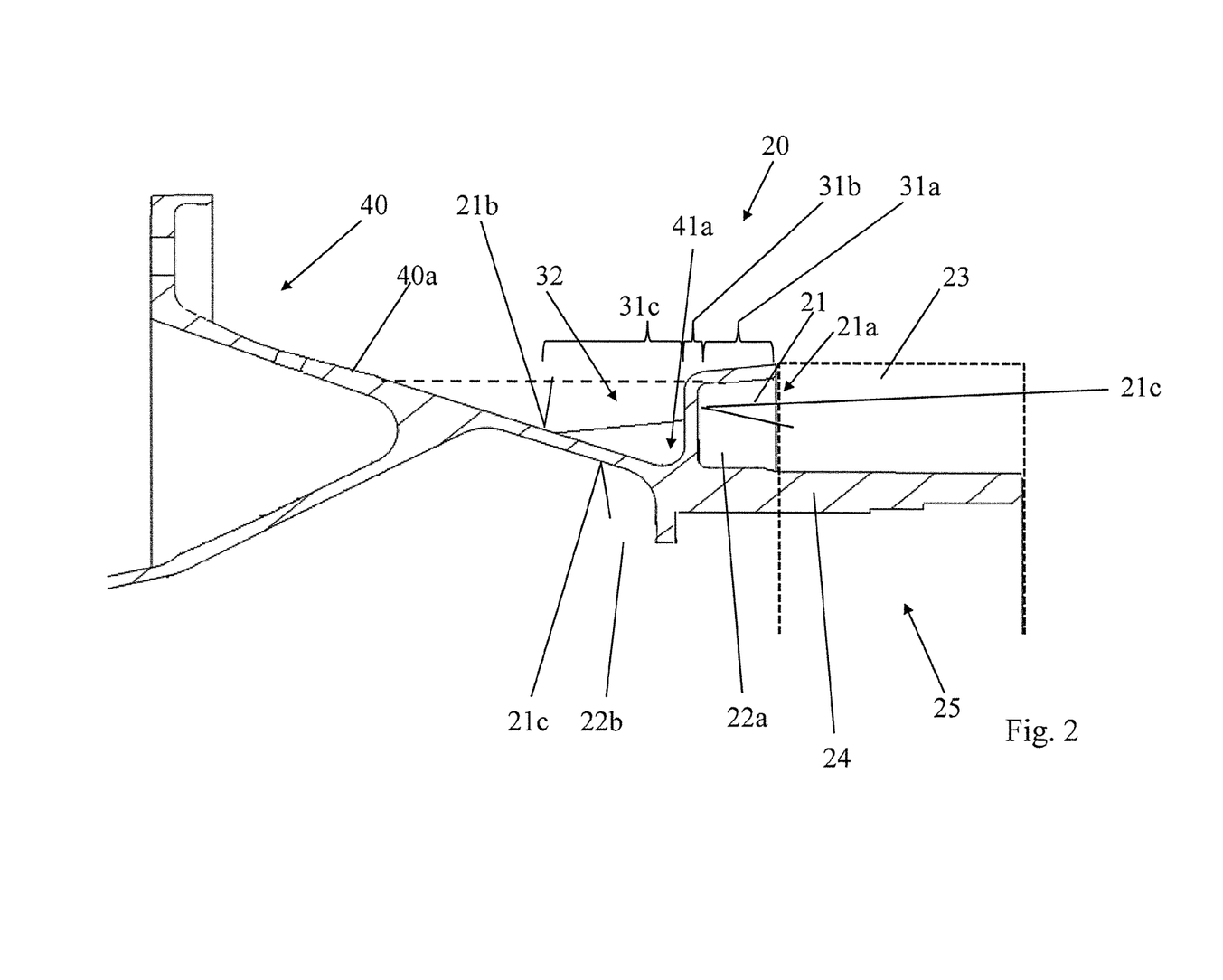
FIG. 2 shows a bearing chamber housing according to the invention in an axially sectioned lateral view.

FIG. 2 shows a part of a bearing chamber housing 20 according to the invention in an axially sectioned lateral view; the plane of section thus contains the axis of rotation 4. The bearing chamber housing 20 has a housing wall 21 that is additively built up in a powder bed process (by SLM), said wall radially bounding an oil chamber 22. A cover 23 of the oil chamber is placed on an axial end 21a of the housing wall 21, said cover being indicated only by the dashed line in FIG. 2. The cover axially bounds the oil chamber 22, which is concretely a region 22a thereof at the axial end 21a. The region of the oil chamber 22a is arranged radially outside a bearing mount 25 formed by an inner shell 24. The mount 25 accommodates a roller bearing (not shown), in which the shaft 3 is guided. The oil disposed in the oil chamber region 22a radially outside the roller bearing creates a certain screening with respect to the hot-gas channel of the turbomachine 1, which can help reduce temperature gradients and thus mechanical stresses.

A special feature is found presently in the extension of the housing wall 21 away from the axial end 21a. The housing wall 21 extends first axially in an axial segment 31a and then springs back radially inwardly in a radial segment 31b. An outer wall surface 21b of the housing wall 21 thus forms there a pocket 32. The housing wall 21 then rises away from the bottom of the pocket, again radially outwardly, in a flanking segment 31c. An inner wall surface 21c opposite to the outer wall surface 21b of the housing wall lies in the radial segment 31b of the extension of the housing wall 21 correspondingly perpendicular to the axis of rotation. The inner wall surface 21c bounds there axially the region 22a of the oil chamber, and, in fact, is found opposite to the cover 23 of the oil chamber.

The housing wall 21c is thus axially displaced backward in the radial segment 31b; it is thus well accessible for a mechanical post-processing prior to introducing the cover 23 of the oil chamber, which is of advantage in view of the additive manufacture (see also the introduction to the description). On the other hand, however, now not only is the inner wall surface 21c simply displaced axially backward, but in addition, the pocket 32 is formed. If the housing wall 21 were not to spring back radially inwardly, but rather extend further axially toward the front (see the dashed line for illustration), thus if the entire region below the dashed line were to be solidly executed and filled with material, then the bearing chamber housing would clearly weigh more.

The pocket 32 is axially bounded by the housing wall 21 in the radial segment 31b and the housing wall 21 in the flanking segment 31c. As can be seen in FIG. 2, the housing wall 21 rises outwardly obliquely to the axis of rotation 4 in the flanking segment 31c. On the outside, the bearing chamber housing 20 has a fastening flange 40 that transitions into the housing wall 21 via a crosspiece 40a. This crosspiece 40a is also oblique relative to the axis of rotation 4, and, in fact, is flush with the oblique extension of the housing wall 21 in the flanking segment 31c.

In the circumferential direction, the pocket 32 is bounded by the housing wall 21 in a first side wall section 41a, which can be seen only partially in FIG. 2.

Figure 3:
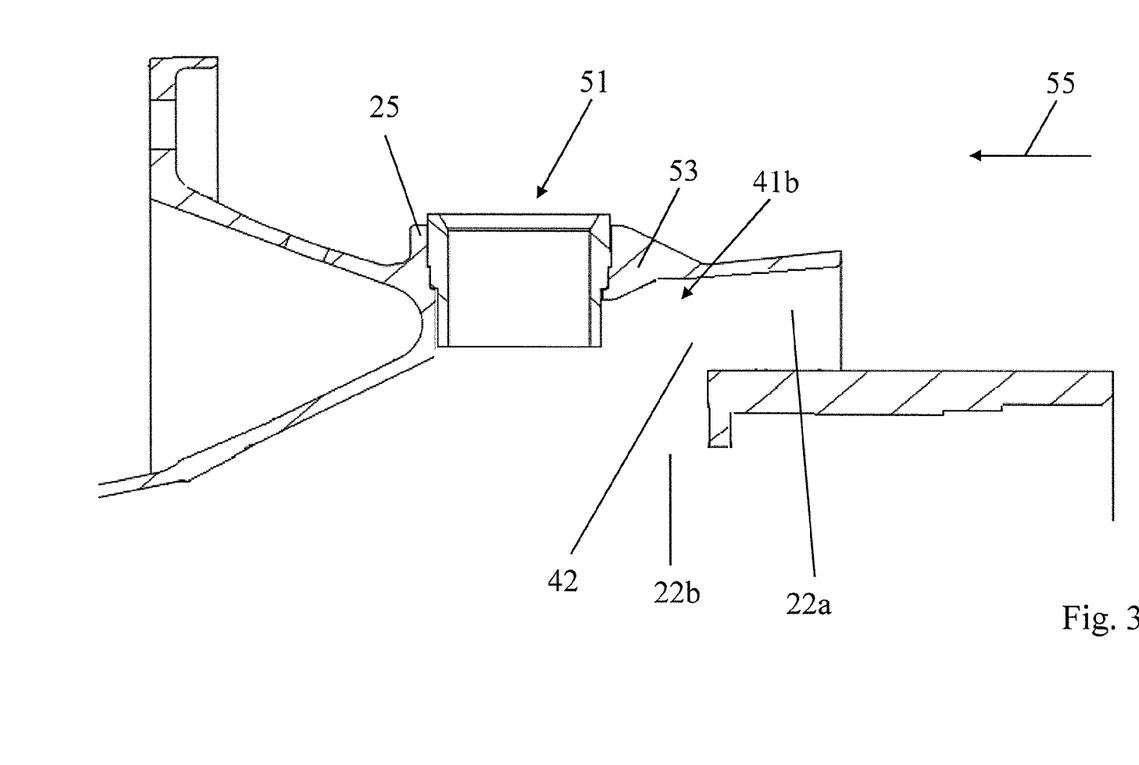
FIG. 3 shows the bearing chamber housing according to FIG. 2 in an axially sectioned lateral view with a rotated plane of section in comparison to FIG. 2.

In FIG. 3, the first side wall section 41a is present in front of the plane of the drawing and the view falls onto a second side wall section 41b. Together, the side wall sections 41a,b bound a connection channel 42 that connects the region 22a of the oil chamber to a region 22b of the oil chamber disposed radially inside the pocket 32.

Refer to the illustration in the following as well as also to FIG. 4 and FIG. 5. In general, the same reference numbers designate the same parts and for their explanation, always refer also to the description for the other figures.

Figure 4:
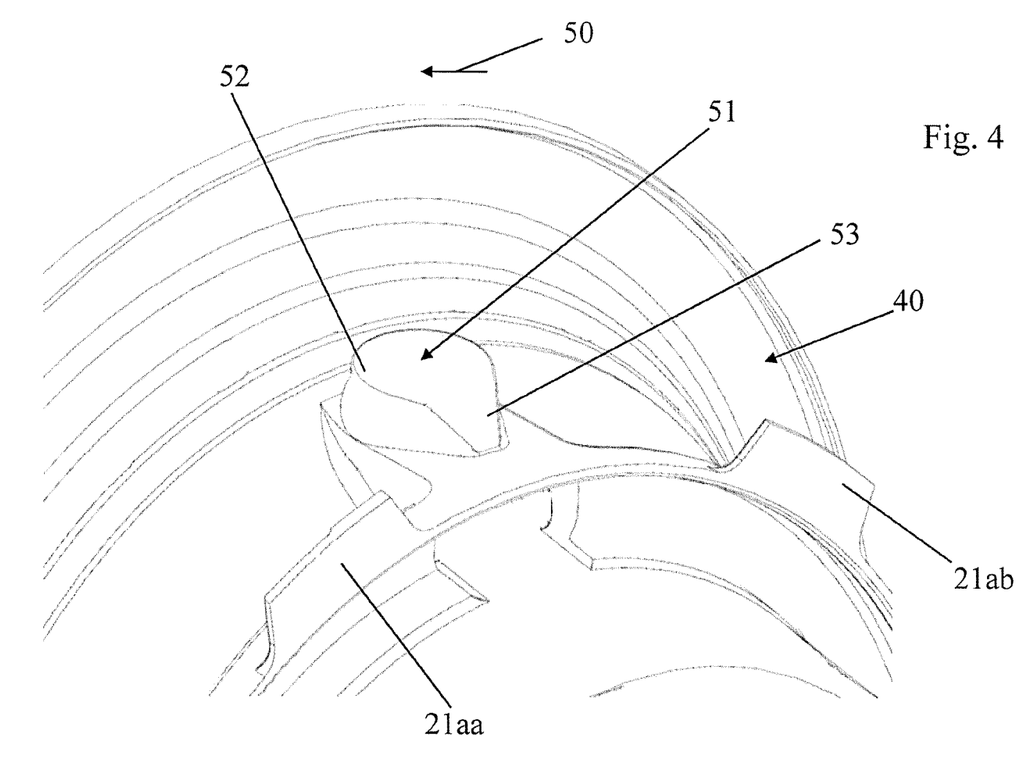
FIG. 4 shows the bearing chamber housing according to FIGS. 2 and 3 in an oblique view from axially toward the back.
Figure 5:
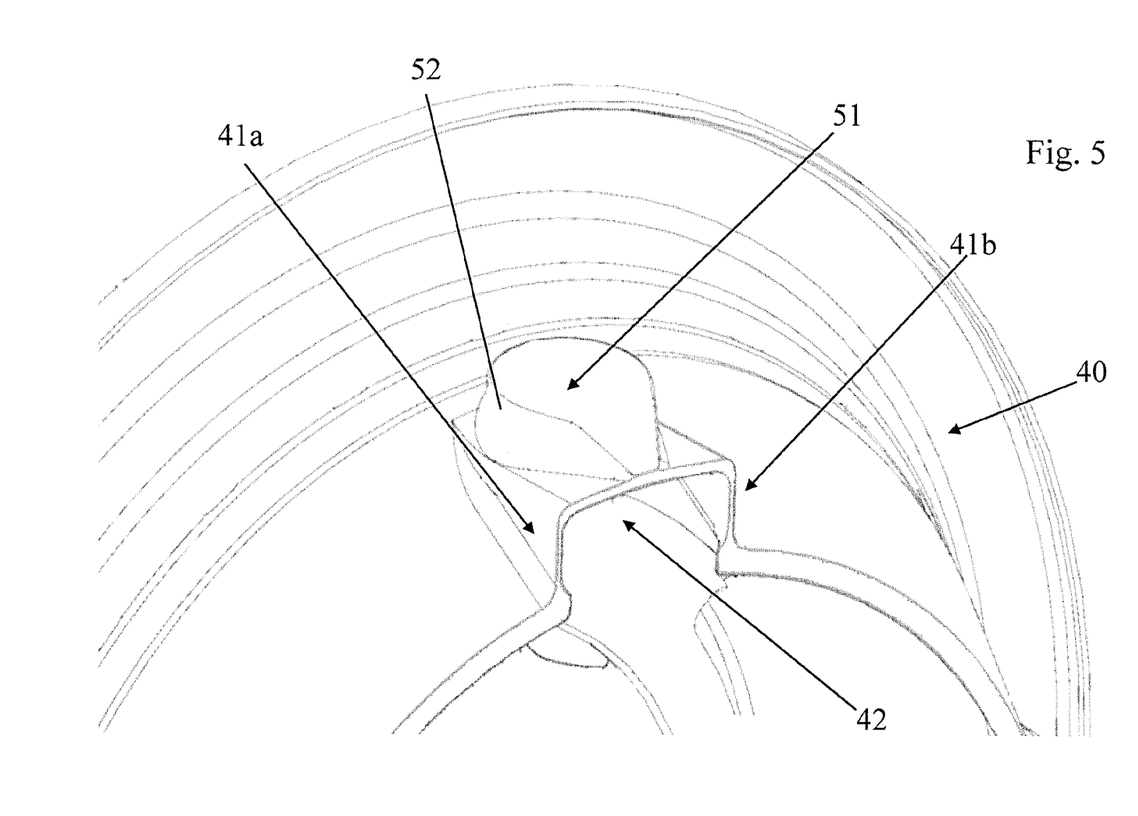
FIG. 5 shows the arrangement according to FIG. 4 in a cut-away representation with a sectional plane perpendicular to the axis of rotation.

In FIG. 4 and in particular in the cut-away view according to FIG. 5, on the one hand, the side wall sections 41a,b can be recognized as well as the connection channel 42 bounding these sections. In the representation according to FIG. 4 that is not cut away, the view falls on the axial end 21a of the housing wall; there, mounting flanges 21aa,ab for mounting the cover 23 of the oil chamber can be seen. In the circumferential direction 50, a connection opening 51 is introduced into the housing wall 21 between the side wall sections 41a,b. This is disposed in a connection piece 52 that can also be seen in the section according to FIG. 3. As can be seen in FIGS. 4 and 5 and also the section according to FIG. 3, the connection piece 52 passes via a rib 53 into the housing wall 21. This design is motivated by the additive manufacture; thus, a critical overhang can be avoided for piece 52. The build-up direction 55 points obliquely toward the front in FIGS. 4 and 5; in this regard, FIG. 5 thus depicts precisely the negative form of a component found in the build-up.

What is claimed is:

1. A bearing chamber housing for bearing a shaft of a turbomachine, having an additively built-up housing wall and a cover of the oil chamber,
    wherein, in each case referred to an axis of rotation of the shaft, the housing wall bounds radially outwardly an oil chamber of the bearing chamber housing and the cover of the oil chamber disposed on an axial end of the housing wall axially bounds a region of the oil chamber; said region bounds radially inwardly an inner shell of the bearing chamber housing,
    wherein, each time referred to the axis of rotation of the shaft, in a circumferential segment viewed in axial section away from the axial end, the housing wall first has an axial extension in an axial segment, and then springs back radially inwardly up to the inner shell in a radial segment, and
    wherein, in the circumferential segment, an outer wall surface of the housing wall, this surface facing away from the oil chamber, forms a pocket when viewed from outside, and in the radial segment, an inner wall surface of the housing wall, this surface being opposite the outer wall surface, axially bounds the region of the oil chamber, and is axially opposite the cover of the oil chamber.

2. The bearing chamber housing according to claim 1, wherein the housing wall in the radial segment extends perpendicularly to the axis of rotation, when viewed in the axial section.

3. The bearing chamber housing according to claim 1, wherein, in the circumferential segment, the housing wall extends radially outwardly obliquely to the axis of rotation, when viewed in the axial section, in a flanking segment that follows the radial segment from the axial end of the housing wall.

4. The bearing chamber housing according to claim 1, further comprising a fastening flange on the outside on the housing wall, the flange projecting radially outwardly and fastening the bearing chamber housing.

5. The bearing chamber housing according to claim 3, wherein a crosspiece of the fastening flange that transitions into the housing wall extends obliquely to the axis of rotation in the circumferential segment, when viewed in the axial section, wherein the crosspiece and the housing wall abut one another in the flanking segment in their extension oblique to the axis of rotation, when viewed in the axial section.

6. The bearing chamber housing according to claim 1, wherein the housing wall has an axial and radial extension in a first side wall section, in which the outer wall surface of the housing wall bounds the pocket in the circumferential direction.

7. The bearing chamber housing according to claim 6, wherein in the first side wall section with the housing wall, in a region of the flanking segment bounding the first side wall section, the housing wall encloses an angle of at least 80° and of at most 100°, when viewed in a section perpendicular to the axis of rotation.

8. The bearing chamber housing according to claim 6, wherein, the housing wall also has an axial and a radial extension in a second side wall section that is displaced relative to the first side wall section in the circumferential direction, wherein the housing wall, with its extension in the first side wall section and the second side wall section in the circumferential direction bounds a connection channel that connects the region of the oil chamber to another region of the oil chamber radially inside the pocket.

9. The bearing chamber housing according to claim 1, wherein a connection opening is introduced in the housing wall, this the opening connecting the oil chamber with an external region outside the housing wall, wherein the connection opening is arranged on an axial position with the pocket.

10. The bearing chamber housing according to claim 8, wherein the connection opening is formed in a connection section that is arranged in the circumferential direction between the first side wall section and the second side wall section.

11. The bearing chamber housing according to claim 10, wherein a connection piece projecting radially outwardly forms the connection opening, wherein the connection piece transitions into the remaining housing wall by an axially and radially extending rib.

12. The bearing chamber housing according to claim 1, wherein the pocket extends over at most 60° in the circumferential direction.

13. The bearing chamber housing according to claim 1, wherein the housing wall is built up additively, together with the inner shell.

14. The bearing chamber housing according to claim 13, wherein the housing wall is built up from the axial end of the housing wall, then over the axial segment to the radial segment.

15. The bearing chamber housing of claim 1, wherein the bearing chamber housing is configured and arranged for use in a turbine midframe of the turbomachine.

16. The bearing chamber housing according to claim 4, wherein a crosspiece of the fastening flange that transitions into the housing wall extends obliquely to the axis of rotation in the circumferential segment, when viewed in the axial section, wherein the crosspiece and the housing wall abut one another in the flanking segment in their extension oblique to the axis of rotation, when viewed in the axial section.

17. The bearing chamber housing according to claim 7, wherein, the housing wall also has an axial and a radial extension in a second side wall section that is displaced relative to the first side wall section in the circumferential direction, wherein the housing wall, with its extension in the first side wall section and the second side wall section in the circumferential direction bounds a connection channel that connects the region of the oil chamber to another region of the oil chamber radially inside the pocket.

18. The bearing chamber housing according to claim 9, wherein the connection opening is formed in a connection section that is arranged in the circumferential direction between the first side wall section and the second side wall section.

* * * * *